Nov. 1, 1932.  W. G. WAITT  1,885,786
DRY CELL AND SEAL THEREFOR
Filed March 15, 1930
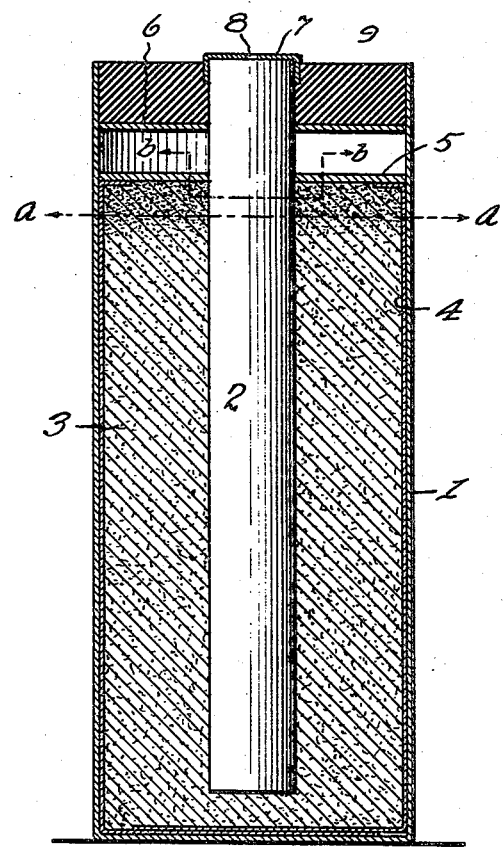
Inventor
W. G. Waitt
By Hull, Brock West
Attorney Patented Nov. 1, 1932

1,885,786

UNITED STATES PATENT OFFICE

WALTER G. WAITT, OF LAKEWOOD, OHIO

DRY CELL AND SEAL THEREFOR

Application filed March 15, 1930. Serial No. 436,085.

This invention relates generally to dry cell batteries and has particular reference to a dry cell battery having the seal of such a character as to permit excessive pressure within the cell to escape and yet be capable of substantially preventing outside air from entering the cell and drying out materials in the interior of the cell.

Heretofore the efficiency and shelf life of dry cell batteries have been greatly reduced due to what is known as gassing or breathing of the cells which results in a drying out of the materials forming the cell.

Therefore one of the main objects of this invention is to provide a dry cell which will practically eliminate these difficulties.

Further and more limited objects of the invention will appear as the description proceeds and by reference to the accompanying drawing in which the figure is a vertical sectional view illustrating the preferred embodiment of my invention.

Referring now to the drawing the reference character 1 designates a metal container or can which is preferably formed of zinc, and in which is arranged a carbon electrode 2 and a mass 3 of depolarizing mix which is insulated from the can by means of a suitable liner 4. Surrounding the upper portion of the carbon electrode 2 is a washer 5 which completely covers the mix. Also surrounding the upper portion of the carbon electrode 2 is a washer 6 which is spaced from the washer 5 so as to provide an expansion chamber. Secured over the upper end of the carbon electrode 2 is a brass cap 7 having a central opening 8 therein. Sealing the upper end of the can and filling the same is a layer of sealing material 9 which is preferably formed of sealing wax.

The upper portion of the mass of mix is impregnated with a suitable oil, either vegetable or mineral, down to about the level indicated by the line $a$—$a$. The upper portion of the carbon electrode 2 is also impregnated with oil down to about the level indicated by the line $b$—$b$. The cell gasses due to the action of the zinc chloride on the carbonates in the materials contained in the mix and carbon dioxide gas is given off. Hydrogen is also given off due to the local action on the zinc can. Considerable gas pressure is obtained within the cell due to this action, and some means must be provided to prevent excessive pressure within the cell. The layer of oil on top of the mix permits excessive pressure to escape and at the same time substantially prevents outside air from penetrating the mix and drying out the same. This layer of oil on the top of the mix and in the pores of the carbon electrode permits gas to bubble up through the layer of oil and escape from the cell when excessive pressure is obtained within the cell. The oil however tends to reseal itself after the passage of gas bubbles therethrough and permanently opened channels are prevented. Without a self-sealing oil layer, air can freely enter and leave the mix, causing evaporation of moisture and a drying out of the mix.

In the construction hereinbefore described, these gases accumulate in the expansion chamber and escape through the upper portion of the carbon electrode which is impregnated with oil and thence through the opening 8 in the brass cap or through openings between the seal and the carbon electrode. Air cannot enter or escape from the interior of the cell without passing through a layer of oil which is self-sealing. The upper portion of the carbon electrode being impregnated with oil seems to form a self-closing seal which prevents the outside air from entering the cell through the carbon electrode. The upper portion of the mix is also impregnated with oil and serves as an additional safeguard and self-closing seal for preventing the outside air from penetrating the mass of mix. The oil also is somewhat soluble in the wax seal and tends to form a more perfect bond between the seal and the wall of the zinc can.

The embodiment of the invention herein disclosed is particularly adapted for use in the small size cells such as are used in flashlights and B batteries, but the invention is also adapted for use with larger size cells. I have found by actual tests and experiments that this construction materially prolongs the shelf life and efficiency of the cell.

It should be understood that the air expansion chamber in the cell may be omitted if desired and that the step of impregnating the upper portion of the mass of mix may be omitted. Various other changes may be made in the details of construction without departing from the spirit of my invention and it is to be understood that the embodiment of the invention herein disclosed is merely illustrative and is not to be considered in a limiting sense. It is therefore understood that the invention is limited only in accordance with the scope of the appended claims. By the term "oil" I include various mixtures containing oil.

Having thus described my invention, what I claim is:

1. A dry cell comprising a metal container having therein a carbon electrode and a mass of depolarizing mix insulated from said container, a layer of sealing material sealing the upper end of the container, the upper portion of said carbon electrode being impregnated with a sufficient quantity of oil to form a self-closing seal to prevent ingress of air therethrough, an apertured metal cap disposed over said carbon electrode, said seal and metal cap completely closing said cell except for the aperture in said cap.

2. A dry cell comprising a metal container having therewithin a carbon electrode and a mass of depolarizing mix insulated from said container, a layer of sealing material sealing the upper end of said container, the upper portion of said carbon electrode being impregnated with a sufficient quantity of oil to form a self-closing seal to prevent ingress of air into the cell therethrough and yet permit excessive pressure within the cell to be relieved therethrough.

In testimony whereof, I hereunto affix my signature.

WALTER G. WAITT.